Patented June 26, 1923.

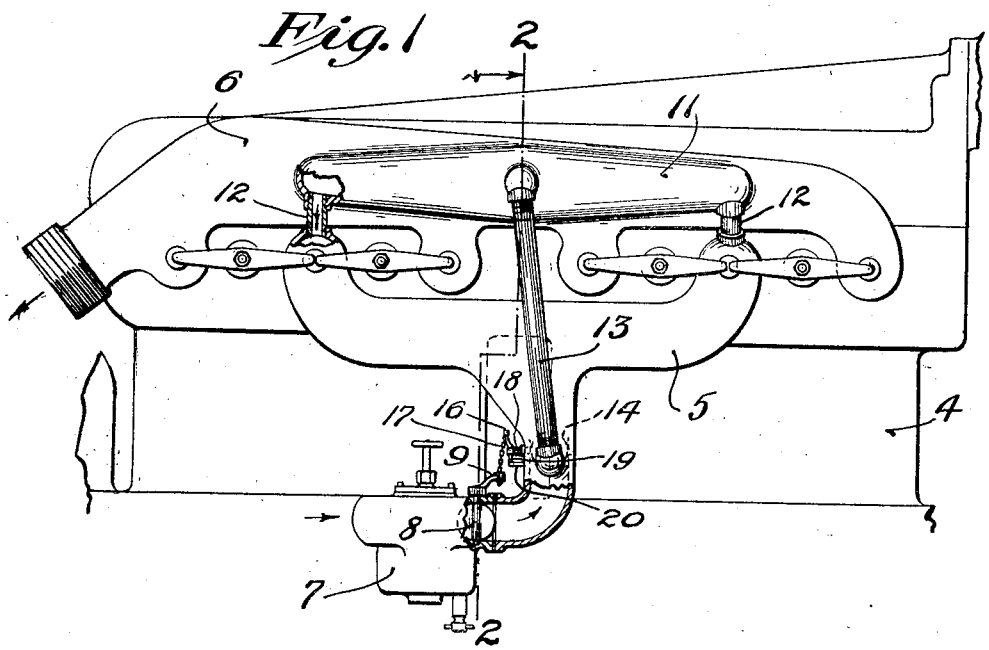

1,459,724

UNITED STATES PATENT OFFICE.

HUGO P. FESENMAIER, OF MORTON, MINNESOTA.

INTAKE MANIFOLD FOR INTERNAL-COMBUSTION ENGINES.

Application filed December 10, 1921. Serial No. 521,359.

*To all whom it may concern:*

Be it known that I, HUGO P. FESENMAIER, a citizen of the United States, residing at Morton, in the county of Renville and State of Minnesota, have invented certain new and useful Improvements in Intake Manifolds for Internal-Combustion Engines; and I do hereby declare the following to be a full, clear, and exact description of the invention, such as will enable others skilled in the art to which it appertains to make and use the same.

My invention has for its object to provide an improved intake manifold for internal combustion engines, and to such ends, consists of the novel construction, combinations and arrangement of parts hereinafter described and defined in the claims.

It has long been recognized that greater efficiency in the use of hydro-carbon fuels under ordinary running conditions may be obtained by pre-heating the hydro-carbon mixture before it is introduced into the engine cylinders, and to this end it has been customary to provide arrangements whereby the hydro-carbon mixture drawn in through the manifold will be pre-heated by heat from the exhaust manifold. Experience, however, has further shown that at certain times or under certain conditions, pre-ignition will be produced where the hydro-carbon mixture is thus pre-heated. For instance, when running up-hill, with the engine running slowly and doing hard work, pre-ignition will occur when the mixture is pre-heated, producing a pounding action much like the pounding action known as "carbon knock."

To overcome the above difficulties and meet all of the requirements of the highest efficiency under all conditions, I have provided a new manifold structure which comprises what may be treated as the main or primary intake manifold and an auxiliary or secondary intake manifold combined with main and auxiliary throttle valves. Both the main and auxiliary manifolds receive the hydro-carbon vapor from the carburetor, but the latter has much less vapor-conducting capacity than the former. The main throttle valve may be and preferably is located, as shown, in the delivery passage of the carbureter proper and may be operated substantially in the usual way. The so-called secondary throttle valve is arranged at the junction of the intake tubes of the two manifolds and normally closes the passage to the main intake manifold, causing all the vapor to pass through the secondary manifold. This secondary manifold is either cast integral with or otherwise applied to or associated with the exhaust manifold in such a way that the vapor passing through said auxiliary manifold will be pre-heated before entering the engine cylinders. In the preferred arrangement, this auxiliary manifold is connected back to the delivery portion of the main manifold as close to the cylinder as possible. Also, there is an automatically operating connection between the two throttle valves, operating the same as hereinafter described.

In the accompanying drawings, wherein like characters indicate like parts throughout the several views, Fig. 1 shows the invention as applied to the intake and exhaust manifolds of a Ford engine, some parts being broken away and some parts being sectioned;

Fig. 2 is a vertical section taken on the line 2—2 of Fig. 1; and

Fig. 3 is a vertical section taken on the line 3—3 of Fig. 2.

The cylinder structure is indicated by the numeral 4, the intake manifold by the numeral 5, the exhaust manifold by the numeral 6 and the carbureter by the numeral 7, all of which parts, except as hereinafter described, may be assumed to be of standard Ford construction. It will, of course, be understood that this invention may be applied to any and all forms of internal combustion engines and adapted to engines of any number of cylinders.

The carbureter 7, in its delivery passage, is provided with the customary throttle valve 8, herein designated as the main throttle valve, and the stem of which projects from the carbureter casing and is provided with the usual arm 9 connected to the front end of the usual throttle rod 10.

In the arrangement illustrated, the so-called auxiliary intake manifold 11 is cast onto one side of the exhaust manifold 6, but, as already stated, it may be otherwise connected thereto. At its ends, this auxiliary manifold 11 is shown as connected, by short tubes 12, to the delivery ends of the main manifold 5 as close as possible to the cylinder casting. The intermediate portion of said auxiliary manifold 11 is connected, by a tube 13, with the intake tube of said main manifold 5.

Located in the intake tube of said main intake manifold 5, just above the point of connection therewith of the auxiliary tube 13, is the so-called secondary throttle valve 14, the stem 15 of which projects, as best shown in Fig. 3, and is provided with an arm 16 that is connected to the throttle valve rod 10 by a flexible connection such as a small chain 17. A torsion spring 18, anchored to the arm 16 and to the adjacent intake tube of the manifold 5, normally holds said valve 14 in its closed position shown in Fig. 2. The arm 16 is shown as provided with a depending stop lug 19 that is adapted to engage a fixed lug 20 to limit the movement of said valve 14 to an extreme open position.

The operation of this improved manifold structure is substantially as follows:

Under normal running conditions, the intake tube of the main manifold 5 will be closed and all of the vapor will be drawn through the tube 13 into the secondary manifold 11 where it will be pre-heated, and from thence will be delivered to the cylinders through the delivery end portions of the main manifold. This, of course, gives pre-heated vapor for all of the ordinary running conditions.

When the engine is working hard at low speed, as when running up-hill, or under any other conditions tending to produce pre-ignition, the throttle rod 10 will be given an extreme movement, thereby causing the secondary throttle valve, as well as the main throttle valve, to be opened. When these two valves are open to extreme positions or nearly so, the vapor can be drawn to the engine through both manifolds, but as the conducting capacity of the main manifold is much greater than that of the secondary manifold, nearly all of the vapor delivered to the engine will be taken directly through the main manifold and, hence, will not be pre-heated to any explosive extent. Of course, it is a well known fact that pre-ignition will not take place nearly as readily with cold vapor as with hot vapor, and in practice, with the arrangement described, there will be no pre-ignition when both throttle valves are open.

Moreover, when the two throttle valves are open, very free or large conducting conduits are afforded for the vapor, so that the vapor will be delivered to the engine not only in cold condition but in increased quantity, so that the increased power required in the engine is afforded. It will be further understood that even with vapor delivery conduits of the same conducting capacity, more vapor of greater density and volume will be delivered to the engine through cold than through hot conduits.

In the preferred arrangement illustrated in the drawings, the chain 17 has such normal slack that the auxiliary valve 14 will remain closed while the main throttle valve is being moved from closed position to approximately one-half extreme open position, and when said throttle valve is moved from its one-half open position to extreme open position, said secondary throttle valves will simultaneously reach extreme open positions.

Of course, it is known that under ordinary running conditions, an engine will run smoother with pre-heated vapor than with cold vapor. My invention provides for this, but also provides extremely simple and efficient means for supplying the relatively cold and more condensed vapor to prevent pre-explosions and "knocking" of the engine when the engine is running at low speed and performing heavy work.

What I claim is:

1. An intake manifold structure for internal combustion engines having two delivery conduits, one of which is arranged to be heated while the other remains relatively cold, a valve which when closed causes the vapor to pass through the heated conduit, a carburetor arranged to deliver to the conduits of said manifold structure, a main throttle valve for controlling the delivery of vapor from said carburetor to said manifold structure, and a connection between said two valves whereby said first noted valve will be moved to open position when said throttle valve is moved to substantially an extreme open position.

2. An internal combustion engine, an exhaust manifold therefor, a main intake manifold, a carburetor connected to said main intake manifold, a main throttle valve for controlling the supply of vapor from said carburetor to said main intake manifold, a secondary intake manifold applied to said exhaust manifold, said secondary intake manifold having an intake tube connecting the same to the intake tube of said main manifold and having its extremities connected to the extremities of said main manifold, a secondary throttle valve applied in the intake tube of said main manifold and normally closing the same but adapted to be moved to an open position, and a connection between said two throttle valves arranged to permit partial opening and closing movements of said main throttle valve without moving said secondary throttle valve but to open said secondary throttle valve when said main throttle valve is moved to substantially an extreme open position.

In testimony whereof I affix my signature.

HUGO P. FESENMAIER.